US012704234B2

(12) United States Patent
Tomas et al.

(10) Patent No.: US 12,704,234 B2
(45) Date of Patent: Aug. 11, 2026

(54) LIGHTING UNIT AND MOTOR VEHICLE LIGHTING DEVICE WITH SUCH A LIGHTING UNIT

(71) Applicant: Marelli Germany GmbH, Reutlingen (DE)

(72) Inventors: Martin Tomas, Reutlingen (DE); Sebastian Pfaff, Reutlingen (DE); Michael Scholl, Reutlingen (DE)

(73) Assignee: Marelli Germany GmbH, Reutlingen (DE)

( * ) Notice: Subject to any disclaimer, the term of this patent is extended or adjusted under 35 U.S.C. 154(b) by 0 days.

(21) Appl. No.: 18/961,747

(22) Filed: Nov. 27, 2024

(65) Prior Publication Data

US 2025/0180180 A1 Jun. 5, 2025

(30) Foreign Application Priority Data

Dec. 5, 2023 (DE) ......................... 102023134023.9

(51) Int. Cl.
*F21S 41/663* (2018.01)
*F21S 41/25* (2018.01)
(Continued)

(52) U.S. Cl.
CPC ............. *F21S 41/663* (2018.01); *F21S 41/25* (2018.01); *F21S 41/40* (2018.01); *F21S 41/63* (2018.01);
(Continued)

(58) Field of Classification Search
CPC ... F21S 41/20–698; F21W 2102/10–20; F21Y 2115/00–10
See application file for complete search history.

(56) References Cited

U.S. PATENT DOCUMENTS 10,457,193 B2 * 10/2019 Ichikawa ................ F21S 41/16
11,964,608 B2 * 4/2024 Muramatsu .......... H05B 47/155
(Continued)

FOREIGN PATENT DOCUMENTS

DE 102010056313 A1 6/2012
DE 102011114636 A1 4/2013
(Continued)

OTHER PUBLICATIONS

Search Report for German Patent Application No. 102023134023.9 dated Jul. 10, 2024.
(Continued)

*Primary Examiner* — Jason M Han
(74) *Attorney, Agent, or Firm* — Howard & Howard Attorneys PLLC

(57) ABSTRACT

The invention relates to a lighting unit for use in conjunction with a light module of a motor vehicle lighting device. The light module is designed to produce a dimmed light distribution with a substantially horizontal cut-off line. The lighting unit has a light source that can be switched independently from the light module and an optical assembly that is assigned to the light source and is designed to deflect light emitted by the light source and to generate overhead lighting with a defined level of illumination which is spatially limited at least towards an oncoming traffic side in an overhead area above the cut-off line of the dimmed light distribution.

15 Claims, 3 Drawing Sheets

(51) Int. Cl.

| | |
|---|---|
| ***F21S 41/40*** | (2018.01) |
| ***F21S 41/63*** | (2018.01) |
| ***F21S 41/657*** | (2018.01) |
| ***F21W 102/155*** | (2018.01) |
| ***F21Y 115/10*** | (2016.01) |

(52) U.S. Cl.
CPC ...... *F21S 41/657* (2018.01); *F21W 2102/155* (2018.01); *F21Y 2115/10* (2016.08)

(56) References Cited

U.S. PATENT DOCUMENTS

| | | | |
|---|---|---|---|
| 2009/0190323 | A1 | 7/2009 | Watanabe et al. |
| 2009/0190324 | A1 | 7/2009 | Watanabe et al. |

FOREIGN PATENT DOCUMENTS

| | | | |
|---|---|---|---|
| DE | 102015015668 | A1 | 7/2016 |
| DE | 102015016375 | A1 | 6/2017 |
| EP | 2578929 | B1 | 5/2020 |
| EP | 2985522 | B1 | 3/2021 |

OTHER PUBLICATIONS

Regulation No. 48 of the Economic Commission for Europe of the United Nations (UNECE)—Uniform provisions concerning the approval of vehicles with regard to the installation of lighting and light-signalling devices [2016/1723] (OJ L 265 Sep. 30, 2016, p. 125, ELI: http://data.europa.eu/eli/reg/2016/1723/oj).

49 CFR 571.108, Standard No. 108; Lamps, reflective devices, and associated equipment. National Highway Traffic Safety Administration, Department of Transportation (https://www.ecfr.gov/current/title-49/part-571/section-571.108) (Oct. 1, 2023 Edition).

* cited by examiner

LIGHTING UNIT AND MOTOR VEHICLE LIGHTING DEVICE WITH SUCH A LIGHTING UNIT

CROSS-REFERENCE TO RELATED APPLICATIONS

The present application claims priority to and all the benefits of German Patent Application No. 102023134023.9, filed on Dec. 5, 2023, the entire contents of which are expressly incorporated herein by reference.

BACKGROUND OF THE INVENTION

1. Field of the Invention

The present invention relates to a lighting unit for use together with a light module of a motor vehicle lighting device, wherein the light module is designed to produce a dimmed light distribution with a substantially horizontal cut-off line (or light-dark boundary).

Furthermore, the invention relates to a motor vehicle lighting device with a housing and a light module arranged therein to produce a dimmed light distribution with a substantially horizontal cut-off line.

2. Description of the Related Art

Overhead lighting in headlamp systems serves to ensure a minimum luminous intensity (solid angle-related luminous flux of a light source; unit [cd]) above a horizontal cut-off line of a dimmed light distribution, e.g., a low beam. This ensures that traffic signs and motorway signs are sufficiently illuminated. In current headlamps, this overhead lighting is achieved by microcylinders on the projection lens of a dimmed light module (see, for example, EP 2 985 522 B1 or DE 10 2011 114 636 A1=EP 2 578 929 B1), a special facet shape in a reflector or, more recently, in the case of digital light distributions, by means of brightening points in the projection image of a digital projector, a DMD- or a micro-LED (μLED)-module.

DE 10 2015 015 668 A1 discloses a lighting unit that illuminates an area above a road in front of the motor vehicle. Furthermore, DE 10 2010 056 313 A1 discloses a motor vehicle lighting device with several light modules, wherein one of the light modules can serve to illuminate an overhead area.

In current applications, the overhead lighting is spatially extended and at the same time—especially in the direction of an oncoming traffic side—not particularly strongly defined or delimited. For example, when using the previous state of the art in a US Adaptive Driving Beam (ADB) driving test according to FMVSS No. 108, this creates “Low Beam” glare at short distances in front of the vehicle, thus preventing the ADB function from working in compliance with the regulations or standards.

With the current state of the art, a shadow is cut into the light distribution when the ADB function is activated in order to shield drivers travelling in front and/or oncoming traffic from glare. However, the shadow in the light distribution also removes the overhead lighting in digital light distributions, which means that the desired traffic sign illumination is missing. Although glare is reduced in the ADB driving test, the required minimum luminous intensities in the overhead area above the cut-off line of the low beam are not achieved, and legal compliance is no longer given.

A special image calculation of the digital light distribution, whereby additional light beams could be sent into the overhead area in order to achieve the minimum luminous intensities there on the one hand, but on the other hand to prevent glare from glare light at short distances in the US-ADB driving test, is often not possible due to limited computing capacity in the control units of the motor vehicle lighting devices.

SUMMARY OF THE INVENTION

On the basis of the described state of the art, the present invention is based on the problem of providing a solution, in particular for motor vehicle lighting devices designed to generate a digital ADB light distribution, on the one hand to achieve the prescribed minimum luminous intensities in the overhead area and on the other hand to prevent glare caused by glare light at short distances in front of the motor vehicle in the US-ADB driving test.

To solve this problem, the present invention is directed toward a lighting unit that has a light source that can be switched independently from the light module of the motor vehicle lighting device to produce the dimmed light distribution, and an optical assembly associated with the light source, which is designed to deflect light emitted by the light source of the lighting unit in order to produce an overhead illumination with a defined level of illumination that is spatially limited at least in the direction of an oncoming traffic side in an overhead area above the cut-off line of the dimmed light distribution.

When the present invention refers to a dimmed light distribution, this may include a classic (static) low beam with a substantially horizontal cut-off line extending across the entire width of the low beam light distribution. The cut-off line preferably has a horizontal section on the oncoming traffic side and a section rising at an angle of 15°, for example, on the driver’s own side. However, it would also be conceivable for the entire cut-off line to be strictly horizontal, i.e., on both the oncoming and the driver’s side, or to have a stepped configuration with horizontal sections on both sides of the road, with the horizontal section on the driver’s side being higher than the horizontal section on the oncoming traffic side.

However, the dimmed light distribution within the scope of the present invention can also include an ADB light distribution in which a shadow is cut into the ADB light distribution to prevent glare for road users travelling ahead on the same side of the road and/or oncoming on the opposite side of the road (so-called ADB switching situation). This can be done, for example, by adjusting one or more DMDs in a DMD module, or by dimming one or more LEDs in a μLED-module. At least in the shadowed area, the ADB light distribution forms a zonal (or local) dimmed light distribution in the sense of the present invention, the overhead area of which can also be illuminated by the lighting unit according to the invention in the special manner described.

One aspect of the invention is therefore a special module/assembly or lighting unit that includes a switchable light source and an optical assembly. In the case of a motor vehicle lighting device designed to produce a digital ADB light distribution, the switchable light source is at least switched on when a shadow is cut into the light distribution (so-called ADB switching situation) to prevent glare of road users travelling ahead and/or oncoming. However, it would also be conceivable for the switchable light source to be permanently switched on and for the overhead lighting with the spatially limited defined level of illumination to be permanently generated, regardless of whether an ADB switching situation is present or not.

In contrast to the prior art, the overhead lighting generated by the lighting unit is spatially clearly defined or limited and controllable at least in the direction of the oncoming traffic side. The overhead lighting produces a clearly defined level of illumination in the overhead area. This prevents blinding other road users during the driving test, especially during a US-ADB driving test according to FMVSS No. 108 "Low Beam", and at the same time ensures the necessary minimum luminous intensities in the overhead area.

The light emitted by the overhead lighting has a significant brightness drop or reduction (a large brightness gradient) between, on the one hand, an area that includes measuring points (e.g., 2 U 4 L; 1.5 U 1 R-3 R) where minimum luminous intensities are required and, on the other hand, a glare area that extends horizontally above the cut-off line on the oncoming traffic side between approximately −8° and −20°. According to FMVSS No. 108 "Low Beam" in the version in force/applicable on the priority date of the present application, the minimum luminous intensity in point 2 U 4 L is 135 cd and in points 1.5 U 1 R-3 R it is as high as 200 cd. These luminous intensity values in the overhead area result from the superimposition of the dimmed light distribution and the separate overhead lighting.

The brightness reduction in the horizontal direction corresponds, for example, to a brightness reduction to 20% of the brightest value within 3° horizontally. For example, the overhead lighting has its greatest brightness at the measuring point 2 U 4 L (i.e., at −4° horizontally), and already at −7° horizontally it has only 20% of the maximum value, or the overhead lighting has its greatest brightness up to −5° horizontally and already at −8° horizontally only 20% of the maximum value.

The overhead lighting can be designed symmetrically to a vertical centre plane, or the overhead lighting is clearly defined or limited only towards (or in the direction of) the oncoming traffic side and its brightness fades out slowly on its own side of the road, e.g., from +5° to +15° or +20° horizontally.

With the help of the lighting unit of the present invention and the narrowly limited overhead lighting generated by it, glare light at short distances in front of the motor vehicle in the ADB driving test, in particular in the US-ADB driving test according to FMVSS No. 108 "Low Beam", can be reduced, while at the same time ensuring legal compliance, in particular with FMVSS No. 108 "Low Beam", in conjunction with the main lighting (i.e., the dimmed light distribution) generated by the light module.

According to an advantageous embodiment of the present invention, it is suggested that the light source of the lighting unit is designed to be activated at least whenever the light module produces the dimmed light distribution. The light module can be designed to produce a classic low beam or a digital or ADB light distribution with a shaded area. However, the light source of the lighting unit can also be permanently activated when the light module is switched off or when it produces a light distribution other than a dimmed light distribution (e.g., a high beam).

According to another embodiment, it is suggested that the optical assembly is designed to illuminate a measuring area in the overhead area, where a minimum luminous intensity is required by law or standard applicable in the respective country or region, so that the legal requirements for the minimum luminous intensity of the dimmed light distribution in the overhead area are met. The legal requirements may be specified, for example, in the USA by the FMVSS (Federal Motor Vehicle Safety Standard) No. 108 "Low Beam" or in the EU by the ECE-R 48.

In one embodiment, the measuring range illuminated by the lighting unit with the overhead lighting includes measuring points 2 U 4 L; 1.5 U 1 R-3 R according to FMVSS No. 108 "Low Beam" in the version in force on the priority date of the present application. This ensures that the dimmed light distribution meets the requirements for the minimum luminous intensity in the overhead area.

Furthermore, it is proposed that the optical assembly is designed to omit with the overhead lighting a glare area on the oncoming traffic side of the dimmed light distribution, in particular in a range of −8° to −20° horizontally. Consequently, the overhead lighting of the lighting unit only illuminates the overhead area in a relatively narrow area on both sides of a vertical centre plane and, in particular, only goes as far as −8° horizontally on the oncoming traffic side. This ensures that in the ADB driving test, in particular in the US-ADB driving test according to FMVSS No. 108 "Low Beam", no glare is produced at short distances in front of the motor vehicle and the legal requirements are met.

According to another embodiment of the invention, it is suggested that the optical assembly is designed to cut out with the overhead lighting measuring points 0.5 U 1 R-3 R in accordance with FMVSS No. 108 "Low Beam" or to illuminate them only with a low luminous intensity. For the purposes of the invention, a low intensity of the overhead lighting is selected such that the minimum brightness of, for example, 500 cd prescribed at these measuring points in accordance with FMVSS No. 108 "Low Beam" is achieved to a large extent by the dimmed light distribution of the light module, which overlays the overhead lighting. In various operational modes of the present invention, at least 70%, and alternatively at least 80%, and alternatively at least 90%, or alternatively 100% of the minimum brightness is generated by the dimmed light distribution, so that the overhead lighting at these measuring points only generates 30%, 20%, 10% or 0% of the minimum brightness.

Illumination of these measuring points with the overhead lighting is not relevant for the ADB case, and these measuring points therefore do not need to be served by the lighting unit according to the invention. This can additionally prevent glare during the ADB driving test, in particular during the US-ADB driving test according to FMVSS No. 108 "Low Beam".

Furthermore, it is proposed that the optical assembly comprises a lens system with at least one lens or a reflection system with at least one reflector and/or a diffusing optics. The overhead lighting according to the invention can be realised independently from the optical system used. The switchable light source preferably comprises at least one semiconductor light source (e.g., an LED).

The present invention is also directed toward a motor vehicle lighting device that is based on the lighting device of the type mentioned at the beginning. In this embodiment, the motor vehicle lighting device has an additional lighting unit arranged in the housing with a light source that can be switched independently from the light module and an optical assembly associated with the latter, which is designed to deflect light emitted by the light source of the additional lighting unit in order to produce an overhead illumination with a defined level of illumination spatially limited at least towards (or in the direction of) an oncoming traffic side in an overhead area above the cut-off line of the dimmed light distribution.

The additional lighting unit of the lighting device is preferably a lighting unit according to the invention, as described above.

According to one embodiment, it is suggested that the additional lighting unit be rigidly coupled to the light module and movable therewith relative to the housing of the motor vehicle lighting device. In this way, the lighting unit together with the light module can be brought into a basic position (in horizontal and/or vertical direction) before intended use. Furthermore, the lighting unit together with the light module can be moved during the intended use as part of a dynamic cornering light, a light range control and/or an ADB function. The lighting unit is always correctly aligned in relation to the light module. The illuminated overhead area is always correctly positioned in relation to the dimmed light distribution.

However, it would also be conceivable for the lighting unit to be separate from the light module and adjustable independently therefrom. The lighting unit can be arranged inside or outside the housing of the lighting device.

According to one embodiment, it is proposed that the light module is adapted to generate an adaptive driving beam (ADB) comprising a glare-free high beam, and that the light source of the additional lighting unit is adapted to be activated at least whenever the light module shades at least part of the overhead area when generating the glare-free high beam. However, the light source of the lighting unit can also be activated permanently when the light module is switched off or when a light distribution is generated without a partially shaded overhead area (e.g., a high beam).

Finally, it is suggested that the light module be designed as a digital projector, a DMD-module or a micro-LED-module. In this case, the resulting light distribution is composed of thousands of light points arranged in a matrix. By deflecting light points at which other road users or traffic participants are located into brighter areas of the light distribution or by switching off certain light points at which other traffic participants are located, sub-areas of a (high) beam distribution can be shaded to prevent blinding of the traffic participants. The other traffic participants are detected, for example, using cameras. In the shaded areas, the resulting light distribution forms a shaded (partial) light distribution.

Further features and advantages of the present invention will be explained in more detail below with reference to the figures. The features shown can also be essential to the invention each for itself, even if this is not shown in the figures and/or explicitly mentioned in the description. Furthermore, the features shown can be combined with each other in any way, even if such a combination is not shown in the figures and/or is not explicitly mentioned in the description.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE INVENTION

Figure 1:
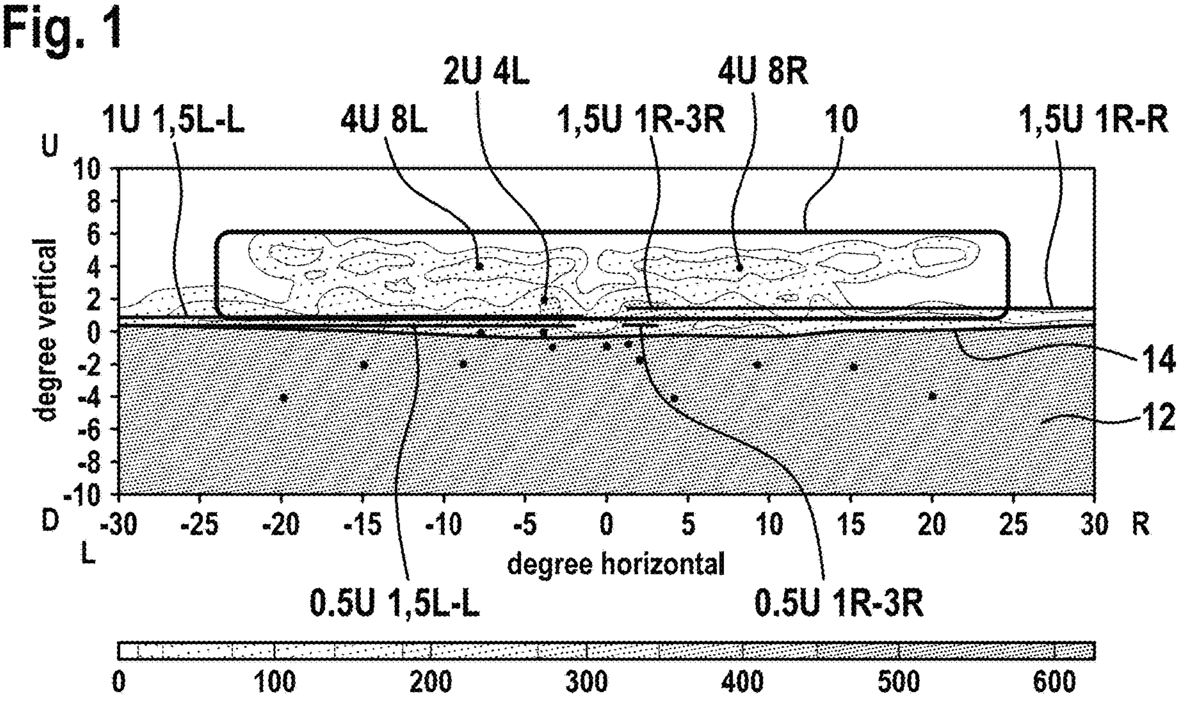
FIG. 1 shows an overhead lighting of a dimmed light distribution according to the US standard, known from the prior art.

In headlamp systems, an overhead lighting or illumination serves to ensure a minimum luminous intensity (solid angle-related luminous flux of a light source; unit [cd]) above an essentially horizontal cut-off line (or light-dark boundary) of the low beam. FIG. 1 shows an example of an overhead lighting 10, known from the prior art, of a dimmed light distribution 12 with a horizontal cut-off line 14 according to the US standard. The cut-off line 14 of the light distribution 12 has an almost flat, straight extension. It can be clearly seen that the overhead lighting 10 has a very wide extension (from about −25° horizontally to +25° horizontally) and no clearly defined or limited contours. In particular, the brightness at the edges of the overhead lighting 10 fades out slowly over relatively large angular ranges.

In FIG. 1, various measuring points according to FMVSS No. 108 "Low Beam" in the version in force on the priority date of the present application are also shown for minimum and/or maximum brightness values in the overhead area. These measuring points include 1 U 1.5 L-L (corresponding to 1° up and 1.5° to the left all the way to the far left); 0.5 U 1.5 L-L; 4 U 8 L; 2 U 4 L; 1.5 U 1 R-3 R (corresponding to 1.5° up and 1.0° to the right all the way to 3° to the right); 4 U 8 R; 0.5 U 1 R-3 R and 1.5 U 1 R-R.

Overhead lighting 10 ensures that traffic signs and informational signs are sufficiently illuminated despite driving with low beam 12. In current headlamps, this overhead lighting 10 is generated, for example, by prisms or micro-cylinders on a projection lens of a low beam module (see FIG. 2), a special facet shape in a reflector (not shown) or, more recently, in the case of digital light distributions (see FIG. 3), by brightening points in the projection image of a digital projector, a DMD- or a micro-LED (μLED)-module.

Figure 2:
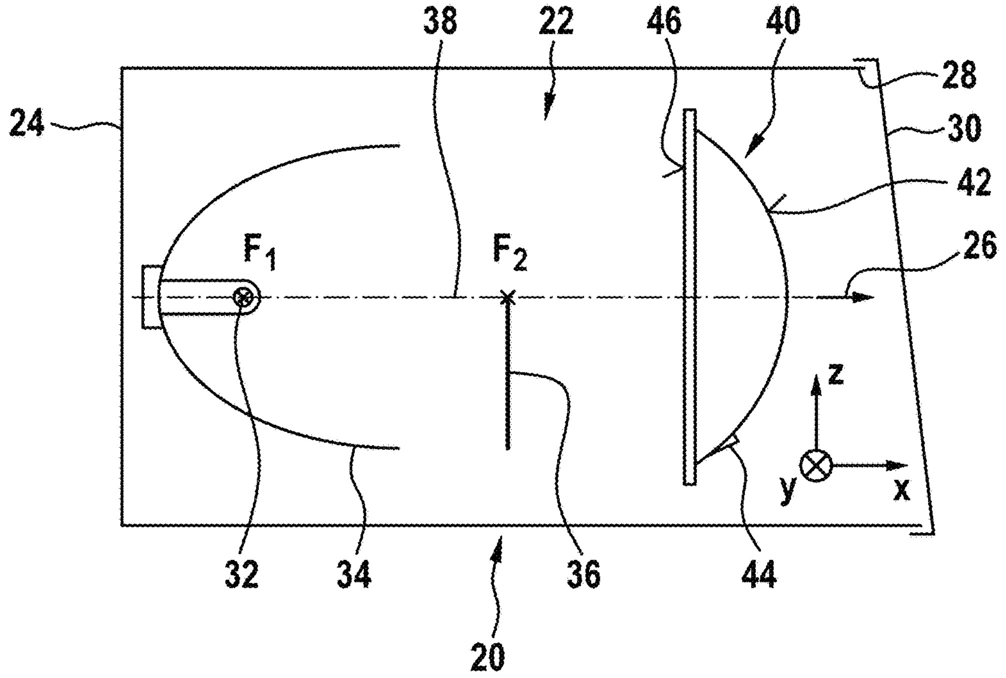
FIG. 2 shows a motor vehicle headlamp known from the prior art, with a projection lens with a prism for producing an overhead lighting.

FIG. 2 shows a schematic longitudinal section through a motor vehicle headlamp 20 known from the prior art. This includes a low beam module 22, which is designed here as a projection module or as an ellipsoidal module. The light module 22 is arranged in a housing 24 of the headlamp 20. The housing 24 has a light exit opening 28 in a light exit direction 26, which is closed by a cover pane 30. The light module 22 includes a light source 32 for emitting light. An ellipsoidal or ellipsoid-like reflector 34 is associated with the light source 32, the light source 32 being arranged at a first focus F_1 of the reflector 34. The reflector 34 focuses the incident light from the light source 32 at a second focal point F_2 of the reflector 34. A shade 36 is arranged in the vicinity of the second focal point F_2, with its upper edge lying approximately at the second focal point F_2. Further in direction 26 along an optical axis 38, a projection lens 40 is arranged, which projects the upper edge of the shade 36 onto the road in front of the motor vehicle as a cut-off line of a dimmed light distribution. A prism-shaped or cylinder-shaped deflecting element 44 is arranged or formed on a light exit surface 42 of the lens 40, which deflects part of the light that has passed through the lens 40 into an overhead area above the cut-off line of the dimmed light distribution in order to generate the overhead lighting. In this case, a light entry surface 46 of the lens 40 is designed flat.

Figure 3:
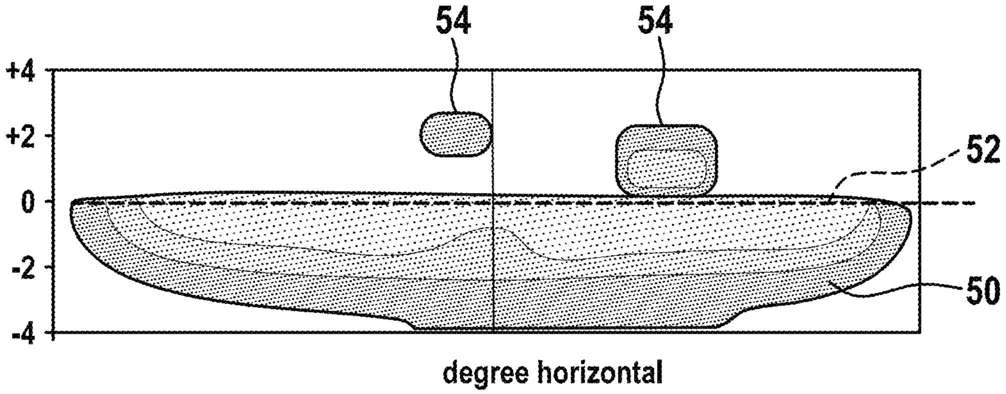
FIG. 3 shows an overhead lighting known from the prior art with a digital light distribution of a digital projector, a DMD- or a μLED-module.
Figure 4:
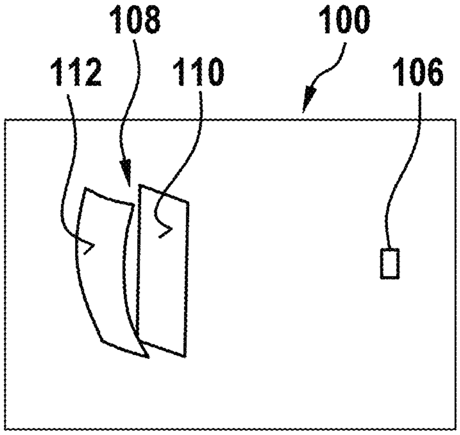
FIG. 4 shows a first perspective schematic view of a lighting unit according to the invention for generating an overhead lighting according to a preferred embodiment.
Figure 5:
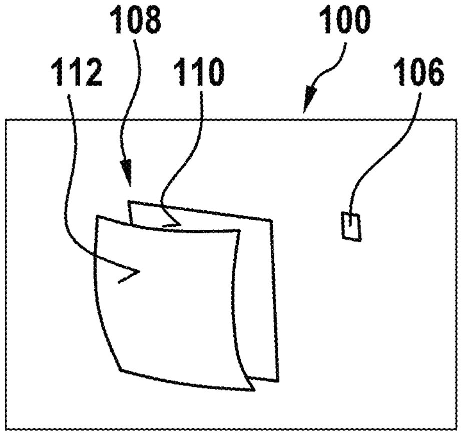
FIG. 5 shows a second perspective view of the lighting unit from FIG. 4.
Figure 6:
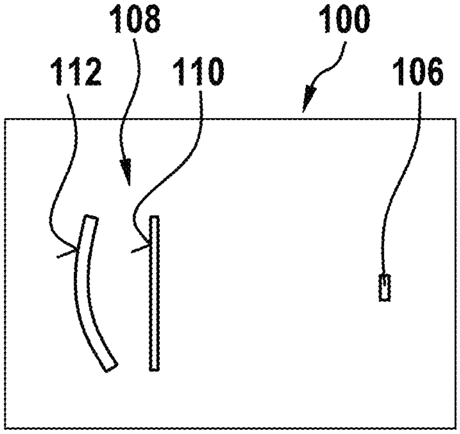
FIG. 6 shows a side view of the lighting unit from FIG. 4.
Figure 7:
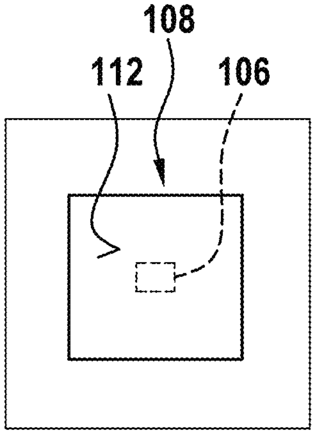
FIG. 7 shows a plan view opposite to a light exit direction, of the lighting unit from FIG. 4.

FIG. 3 shows a digital dimmed light distribution 50 known from the prior art. This has an almost flat cut-off line 52 (or light-dark boundary). The digital light distribution 50 is generated, for example, by a digital projector, a DMD- or a μLED-module. Bright spots in the projection image are shown on an exemplary basis and designated by reference sign 54.

In current applications, the overhead lighting or illumination is spatially extended and at the same time not particularly well defined or limited (see FIG. 1). For example, when using the previous prior art in the US Adaptive Driving Beam (ADB) driving test according to FMVSS No. 108 "Low Beam", it will produce glare at short distances in front of the motor vehicle and thus prevent an ADB function in compliance with FMVSS No. 108 "Low Beam".

In connection with lighting known in the art, the ADB function cuts a shadow into a (high) beam light distribution in order to shade traffic participants or road users in front and/or oncoming and prevent them from being blinded. However, the shadow in the light distribution also removes the overhead lighting 10 in digital light distributions (see FIG. 3), which means that the desired illumination of traffic signs is missing. Although as a result the glare in the US-ADB driving test is reduced, the required values for minimum luminous intensities at specified measuring points above the cut-off line 52 of the low beam 50 are not achieved, and legal compliance is no longer given.

The present invention proposes a separate lighting unit 100 (see FIGS. 4 to 7) for use together with a light module 102 of a motor vehicle lighting device 104 (see FIG. 9), wherein the light module 102 is designed to produce a dimmed light distribution 116 (see FIG. 8) with a substantially horizontal cut-off line 118. The lighting device 104 is designed in particular as a headlamp, for example similar to the headlamp 20 in FIG. 2, but without deflection elements 44 on the lens 40. Instead of the projection module 22 in FIG. 2, the lighting device 104 according to the invention can also comprise a reflection module, a digital projector, a DMD-module or a micro-LED-module. In the latter cases, the resulting digital light distribution 116 is composed of thousands of light points arranged in a matrix-like pattern. By deflecting certain light points at which other traffic participants are located into brighter areas of the light distribution 116 or by dimming, shading or switching off certain light points at which other traffic participants are located, sub-areas of a (high beam) light distribution can be shaded in order to prevent blinding of the traffic participants. The other traffic participants are detected using cameras, for example. In the shaded areas, the resulting light distribution 116 forms a shaded (partial) light distribution.

Figure 8:
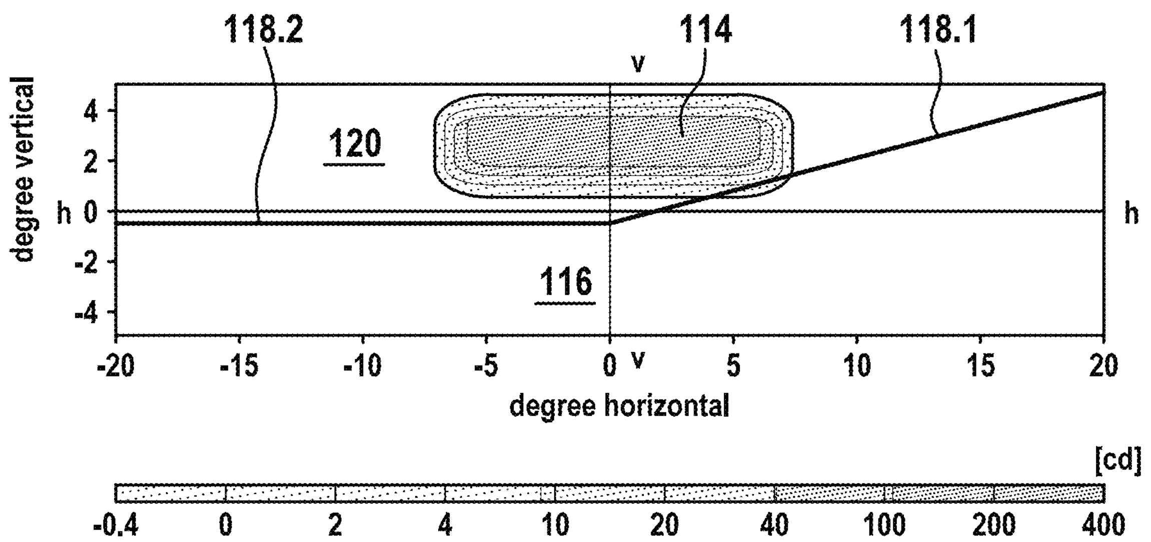
FIG. 8 shows an overhead lighting according to the invention in accordance with a preferred embodiment.

As shown in FIG. 8, the cut-off line 118 may have a horizontal section 118.2 on the oncoming traffic side (FIG. 8 shows right-hand traffic) and a section 118.1 rising at an angle of 15°, for example, on the driver's own side of the road. However, a strictly horizontal course of the entire cut-off line 118 would also be conceivable, i.e., on both the opposite and driver's own side of the road (similar to the cut-off line 52 shown in FIG. 3), or a stepped course with horizontal sections on both sides of the road (oncoming and own traffic side), with the horizontal section on the driver's own side of the road being higher than the horizontal section on the opposite side of the road, where the oncoming traffic is (not shown). Above the cut-off line 118, there is a so-called overhead area 120.

The lighting unit 100 has a light source 106 that can be switched independently from the light module 102 to generate the dimmed light distribution 116, and an optical assembly 108 assigned to the light source 106. The light source 106 includes, for example, at least one semiconductor light source, in particular at least one LED. In the example of FIGS. 4 to 7, the assembly 108 is shown as a lens system with a lens, of which a light entry surface 110 and a light exit surface 112 can be seen. Of course, the lens system can also comprise more than one lens. Alternatively or additionally, however, the optical assembly 108 could also comprise a reflector and/or a diffusing optical system. The optical assembly 108 is designed to redirect light emitted by the light source 106 of the lighting unit 100 to generate an overhead lighting or illumination 114 that is spatially limited and defined at least in the direction of an oncoming traffic side in the overhead area 120 above the cut-off line 118 of the dimmed light distribution 116.

The dimmed light distribution 116 in the context of the present invention may be a conventional (static) low beam (see FIG. 8). However, it could also be a digital or ADB beam in which a shadow is cut into the ADB light distribution to prevent glare for or blinding of other traffic participants or road users travelling ahead and/or oncoming (so-called ADB switching situation). The shaded area of the ADB light distribution represents a (zonal or partial) dimmed light distribution 116 in the sense of the present invention, the overhead area 120 of which can also be illuminated by the separate lighting unit 100 according to the invention in the special manner described.

The fact that the lighting unit 100 is designed separately from the light module 102 and can be activated independently therefrom means that the overhead area 120 can be illuminated even when parts of the light distribution 116 are shaded, e.g., in the case of digital or ADB light distributions.

In the case of a motor vehicle headlamp 104 designed to produce a digital ADB light distribution or beam pattern, the switchable light source 106 of the lighting unit 100 is turned on at least when a shadow is cut into the ADB beam pattern to prevent glare for or blinding of other traffic participants or road users travelling ahead and/or oncoming (so-called ADB switching situation). However, it would also be conceivable for the switchable light source 106 to be turned on permanently and for the overhead lighting 114 to be permanently generated with the spatially limited defined level of illumination, regardless of whether or not there is an ADB switching situation.

In contrast to the prior art, the overhead lighting 114 generated by the lighting unit 100 is spatially clearly defined and limited at least towards (or in the direction of) the oncoming traffic side and well controllable. The brightness reduction or drop in the horizontal direction, at least towards the oncoming traffic side, corresponds, for example, to a brightness reduction or drop to 20% of the brightest value within 3° horizontally. For example, overhead lighting 114 has its maximum brightness at measuring point 2 U 4 L (i.e., at 2° vertically and −4° horizontally) and only 20% of the maximum value, or the overhead lighting 114 has its greatest brightness up to −5° horizontally and only 20% of the maximum value already at −8° horizontally.

The overhead lighting 114 can be designed symmetrically in respect to a vertical centre plane vv (see FIG. 8), or the overhead lighting 114 is only clearly defined towards the oncoming traffic side and its brightness slowly fades out on its own traffic side, e.g., from +5° to +15° or +20° horizontally (not shown).

The overhead lighting 114 produces a clearly defined level of illumination in the overhead area 120. This prevents, on the one hand, glare for other road users in the driving test, especially in a US-ADB driving test, and at the same time ensures that the necessary minimum luminous intensities in the shadows are reached. The light emitted by the overhead lighting 114 has a clearly visible (significant) brightness reduction or drop (i.e., a large brightness gradient) between, on the one hand, an area that includes measuring points (e.g.: 2 U 4 L; 1.5 U 1 R-3 R), where a minimum luminous intensity is required, and on the other hand a glare area, which extends on the oncoming traffic side, for example, approximately between −8° and −20° horizontally. With the help of the lighting unit 100 and the narrowly limited overhead lighting 114 generated by the lighting unit 100, glare at short distances in front of the motor vehicle during the ADB driving test, in particular during the US-ADB driving test according to FMVSS No. 108 "Low Beam", can be reduced while at the same time ensuring legal compliance, in particular in accordance with FMVSS No. 108 "Low Beam", in co-operation or superimposition with the main lighting (dimmed light distribution 116) generated by the light module 102.

It is proposed that the optical assembly 108 is designed to illuminate, with the defined level of illumination or the overhead lighting 114, a measuring area in the overhead area 120, where a minimum luminous intensity is required by law or standard applicable in the respective country or region, so that the legal requirements for the minimum luminous intensity in the overhead area 120 of the dimmed light distribution 116 are met. The legal requirements may be specified, for example, in the USA by the FMVSS (Federal Motor Vehicle Safety Standard) No. 108 "Low Beam" in the version in force/applicable on the priority date of present application or in the EU by the ECE-R 48 regulation.

In one embodiment, the measuring area illuminated by the lighting unit 100 with the defined level of illumination or the overhead lighting 114 includes the measuring points 2 U 4 L (2° vertically, 4° horizontally); 1.5 U 1 R-3 R (1.5° vertically, 1° to 3° horizontally) according to FMVSS No. 108 "Low Beam". This ensures that the dimmed light distribution 116 fulfils the requirements for minimum luminous intensity in the overhead area 120.

Furthermore, the optical assembly 108 may be designed to omit with the defined level of illumination or the overhead lighting 114 a glare area on an oncoming traffic side of the light distribution 116, in particular in a range from −8° to −20° horizontally (see FIG. 8). Consequently, the overhead lighting 114 formed by the lighting unit 100 only illuminates the overhead area 120 in a relatively narrowly limited region on both sides of a vertical centre plane (vv) and, in one embodiment, only extends to a maximum of −8° horizontally on the oncoming traffic side. This ensures that no glare is produced by glare light at short distances in front of the motor vehicle in the ADB driving test, in particular in the US-ADB driving test according to FMVSS No. 108 "Low Beam".

Furthermore, it is suggested that the optical assembly 108 is designed to omit measuring points 0.5 U 1 R to 3 R (0.5° vertically, 1° to 3° horizontally) according to FMVSS No. 108 "Low Beam" with the defined level of illumination or to illuminate them only with low luminous intensity. For the purpose of the invention, a low luminous intensity of the overhead lighting 114 is selected such that the minimum brightness of, for example, 500 cd prescribed in accordance with FMVSS No. 108 "Low Beam" at these measuring points 0.5 U 1 R to 3 R is achieved to a predominant extent by the dimmed light distribution 116 of the light module 102, which is superimposed with the overhead lighting 114. In various operational modes of the present invention, at least 70%, and alternatively at least 80%, and alternatively at least 90%, or alternatively 100% of the minimum brightness is generated by the dimmed light distribution 116 at these measuring points, so that the overhead lighting 114 only generates 30%, 20%, 10% or 0% of the minimum brightness at these measuring points. The illumination of these measuring points is not relevant for the ADB case and thus does not have to be provided by the lighting unit 100 according to the invention. This can additionally prevent glare during the ADB driving test, in particular during the US-ADB driving test.

Figure 9:
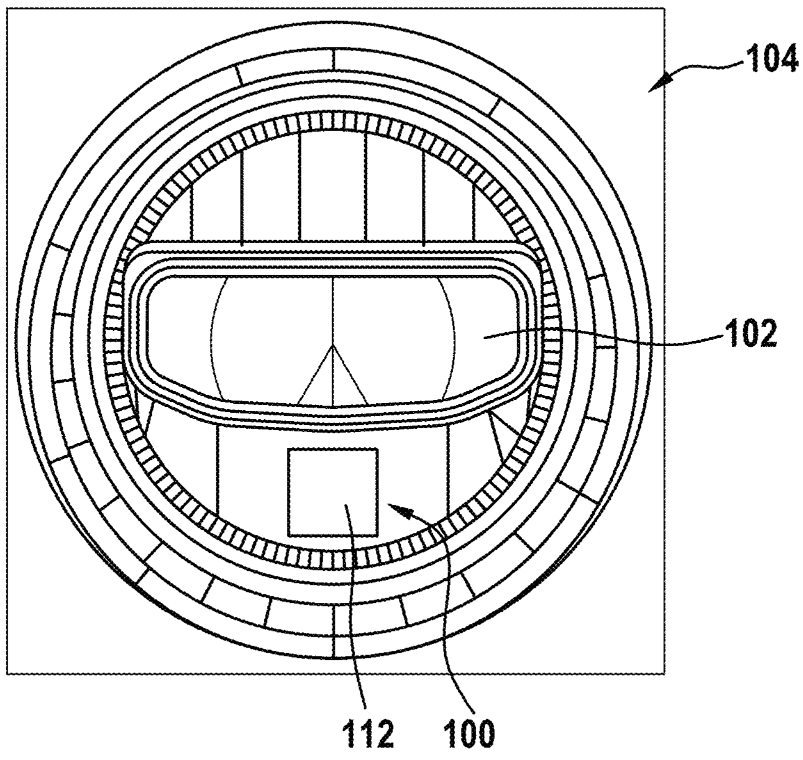
FIG. 9 shows a plan view opposite to the light exit direction, of a light module of a motor vehicle headlamp according to the invention, with a lighting unit according to the invention coupled to the light module.

As can be seen in FIG. 9, the additional lighting unit 100 can be rigidly coupled to the light module 102 and can be moved therewith in respect to the housing, such as the housing 24 from FIG. 2, of the motor vehicle lighting device 104. In this way, the lighting unit 100 together with the light module 102 can be brought into a basic position or setting (horizontal and/or vertical) before their intended use. Furthermore, the lighting unit 100 together with the light module 102 can be moved during their intended use as part of a dynamic cornering light, a light range control and/or an ADB function. The lighting unit 100 is always correctly aligned in relation to the light module 102. Consequently, the illuminated overhead area 114 is always correctly positioned in relation to the dimmed light distribution 116.

However, it would also be conceivable for the lighting unit 100 to be designed separately from the light module 102 and to be adjustable independently therefrom. The lighting unit 100 can be arranged inside the housing, e.g., the housing 24 from FIG. 2, of the lighting device 104 or outside.

The light module 102 is particularly preferably designed to generate an adaptive driving beam (ADB) which comprises a so-called glare-free high beam, and the light source 106 of the additional lighting unit 100 is designed to be activated at least whenever the light module 102 shades at least part of the overhead area 120 when generating the glare-free high beam. This shaded region may then be illuminated with the overhead lighting 114 by the lighting unit 100.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A lighting unit for use together with a light module of a motor vehicle lighting device, wherein the light module is designed to produce a dimmed light distribution with a substantially horizontal cut-off line, said lighting unit comprising:

a light source that can be switched independently from the light module and an optical assembly associated with the light source, said optical assembly designed to deflect light emitted by the light source of the lighting unit to produce an overhead illumination with a defined illumination level which is spatially limited at least towards an oncoming traffic side in an overhead area above the cut-off line of the dimmed light distribution;

wherein the optical assembly illuminates, with the overhead lighting, a measuring area in the overhead area where a minimum luminous intensity is required, so that the requirements for the minimum luminous intensity in the overhead area of the dimmed light distribution are fulfilled; and wherein the measuring area includes measuring points for minimum luminous intensities 2 U 4 L; 1.5 U 1 R to 3 R required by standard according to Federal Motor Vehicle Safety Standards No. 108 "Low Beam" in the version in force on the priority date of the present application.

2. The lighting unit as set forth in claim 1, wherein the light source of the lighting unit is designed to be activated at least whenever the light module produces the dimmed light distribution.

3. The lighting unit as set forth in claim 1, wherein the optical assembly is designed to omit, with the overhead illumination, a glare area on the oncoming traffic side of the dimmed light distribution, in particular in a region of −8° to −20° horizontally.

4. The lighting unit as set forth in claim 3, wherein the optical assembly is designed to omit, with the overhead lighting, measuring points 0.5 U 1 R to 3 R in accordance with Federal Motor Vehicle Safety Standards No. 108 "Low Beam" in the version in force on the priority date of the present application or to illuminate these measuring points only with low luminous intensity.

5. The lighting unit as set forth in claim 1, wherein the optical assembly is designed to omit, with the overhead lighting, measuring points 0.5 U 1 R to 3 R in accordance with Federal Motor Vehicle Safety Standards No. 108 "Low Beam" in the version in force on the priority date of the present application or to illuminate these measuring points only with low luminous intensity.

6. The lighting unit as set forth in claim 1, wherein the optical assembly comprises a lens system with at least one lens or a reflection system with at least one reflector or a diffusing optics.

7. A motor vehicle lighting device comprising:

a housing and a light module arranged therein for producing a dimmed light distribution with a substantially horizontal cut-off line, an additional lighting unit arranged in the housing, with a light source that can be switched independently from the light module and an optical assembly associated with the light source, which is designed to deflect light from the light source of the additional lighting unit to produce an overhead illumination with a defined level of illumination, which is spatially limited at least towards an oncoming traffic side, in an overhead region above the cut-off line of the dimmed light distribution;

wherein the optical assembly illuminates, with the overhead lighting, a measuring area in the overhead area where a minimum luminous intensity is required, so that the requirements for the minimum luminous intensity in the overhead area of the dimmed light distribution are fulfilled; and wherein the measuring area includes measuring points for minimum luminous intensities 2 U 4 L; 1.5 U 1 R to 3 R required by standard according to Federal Motor Vehicle Safety Standards No. 108 "Low Beam" in the version in force on the priority date of the present application.

8. The motor vehicle lighting device as set forth in claim 7, wherein the light source of the lighting unit is designed to be activated at least whenever the light module produces the dimmed light distribution.

9. The motor vehicle lighting device as set forth in claim 7, wherein the additional lighting unit is rigidly coupled to the light module and is movable therewith in respect to the housing of the motor vehicle lighting device.

10. The motor vehicle lighting device as set forth in claim 7, wherein the light module is designed to produce an adaptive driving beam which includes a glare-free high beam, and wherein the light source of the additional lighting unit is designed to be activated at least whenever the light module, in the course of generating the glare-free high beam, shades at least part of the overhead area.

11. The motor vehicle lighting device as set forth in claim 10, wherein the light module is in the form of a digital projector, a DMD-module or a micro-LED-module.

12. The motor vehicle lighting device as set forth in claim 7, wherein the additional lighting unit is designed to illuminate, with the overhead lighting, a measuring area in the overhead area where a minimum luminous intensity is required, so that the requirements for the minimum luminous intensity in the overhead area of the dimmed light distribution are fulfilled.

13. The motor vehicle lighting device as set forth in claim 7, wherein the additional lighting unit is designed such that the measuring area includes measuring points for minimum luminous intensities 2 U 4 L; 1.5 U 1 R to 3 R required by standard according to Federal Motor Vehicle Safety Standards No. 108 "Low Beam" in the version in force on the priority date of the present application.

14. The motor vehicle lighting device as set forth in claim 7, wherein the optical assembly is designed to omit, with the overhead illumination, a glare area on the oncoming traffic side of the dimmed light distribution, in particular in a region of −8° to −20° horizontally.

15. The motor vehicle lighting device as set forth in claim 7, wherein the optical assembly is designed to omit, with the overhead lighting, measuring points 0.5 U 1 R to 3 R in accordance with FMVSS No. 108 "Low Beam" in the version in force on the priority date of the present application or to illuminate these measuring points only with low luminous intensity.

* * * * *